(12) United States Patent
Nordin

(10) Patent No.: US 11,202,695 B2
(45) Date of Patent: Dec. 21, 2021

(54) DENTAL POST, METHOD FOR ITS FABRICATION, AND SET OF DENTAL POSTS

(71) Applicant: Peter Nordin, Chernex (CH)

(72) Inventor: Peter Nordin, Chernex (CH)

( * ) Notice: Subject to any disclaimer, the term of this patent is extended or adjusted under 35 U.S.C. 154(b) by 183 days.

(21) Appl. No.: 16/439,910

(22) Filed: Jun. 13, 2019

(65) Prior Publication Data

US 2019/0388199 A1 Dec. 26, 2019

(30) Foreign Application Priority Data

Jun. 20, 2018 (EP) .................................... 18178865

(51) Int. Cl.
*A61C 13/30* (2006.01)
*A61C 5/35* (2017.01)

(52) U.S. Cl.
CPC ................ *A61C 13/30* (2013.01); *A61C 5/35* (2017.02)

(58) Field of Classification Search
CPC ..... A61C 13/30; A61C 13/0027; A61C 13/01; A61C 13/10; A61C 13/1009; A61C 13/225; A61C 13/2255; A61C 13/265; A61C 13/2653; A61C 5/30; A61C 5/35; A61C 8/00; A61C 8/0018; A61C 8/0019; A61C 8/0022; A61C 8/0024; A61C 8/0025; A61B 17/846; A61B 17/848
USPC ........ 433/173, 174, 176, 219, 220, 221, 224
See application file for complete search history.

(56) References Cited

U.S. PATENT DOCUMENTS

| | | | | |
|---|---|---|---|---|
| 9,517,117 | B2* | 12/2016 | Karmaker | ............... A61L 15/24 |
| 2003/0124488 | A1* | 7/2003 | Gittleman | ............ A61C 8/0033 433/173 |
| 2003/0148247 | A1* | 8/2003 | Sicurelli, Jr. | .......... A61C 13/30 433/220 |
| 2005/0123881 | A1 | 6/2005 | Karmaker et al. | ............. 433/220 |
| 2006/0024645 | A1 | 2/2006 | Nordin | .......................... 433/224 |

(Continued)

FOREIGN PATENT DOCUMENTS

EP    2 281 524 A1    2/2011

OTHER PUBLICATIONS

European Search Report dated Dec. 15, 2018 in corresponding European Patent Application No. 18178865.4.

*Primary Examiner* — Ralph A Lewis
(74) *Attorney, Agent, or Firm* — Ostrolenk Faber LLP

(57) ABSTRACT

A dental post configured to be fitted within a dental cavity of a tooth being restored. The post comprises a head portion and a foot portion consecutively arranged in an axial direction of the post, the axial direction being defined as a direction in which a central axis of the head portion extends. The foot portion comprises a free lower end such that the post can be inserted into the dental cavity in the axial direction with the lower end inwardly facing a closed inner end of the dental cavity. At least the foot portion is composed of a composite material comprising a resin matrix reinforced with fibers. A method of fabrication of such a dental post, and to set comprising at least two such dental posts. To allow a better adaptability of the dental post to a variety of naturally occurring dental cavities, the foot portion comprises a plurality of rods being separated from one another along the axial direction of the post such that each rod is bendable in a transverse direction with respect to the axial direction.

20 Claims, 7 Drawing Sheets

(56) References Cited

U.S. PATENT DOCUMENTS

| | | | |
|---|---|---|---|
| 2011/0033828 A1* | 2/2011 | Nordin | B29C 70/52 |
| | | | 433/221 |
| 2011/0294095 A1* | 12/2011 | Jancar | A61C 13/1009 |
| | | | 433/206 |
| 2012/0129132 A1* | 5/2012 | Lomicka | A61C 8/0033 |
| | | | 433/173 |
| 2017/0172706 A1* | 6/2017 | Lapinski | A61C 13/30 |
| 2018/0147037 A1* | 5/2018 | Kim | A61C 8/00 |
| 2020/0345467 A1* | 11/2020 | Alcantara | G03G 9/0804 |

* cited by examiner

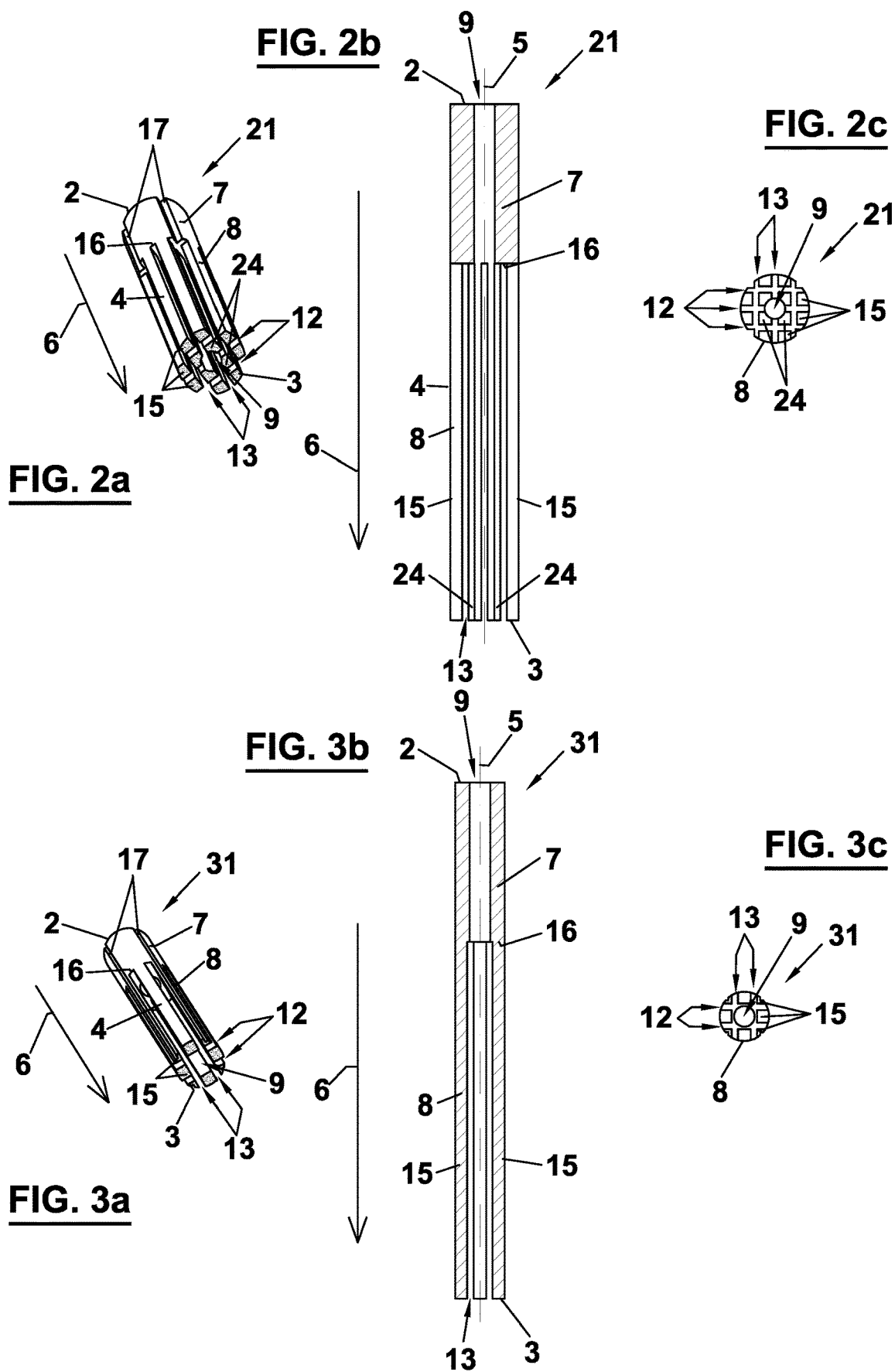

FIG. 4a
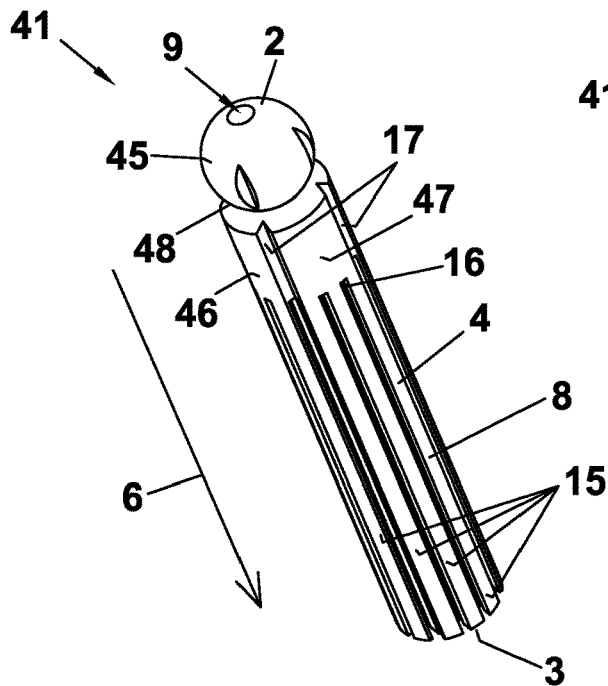
FIG. 4b
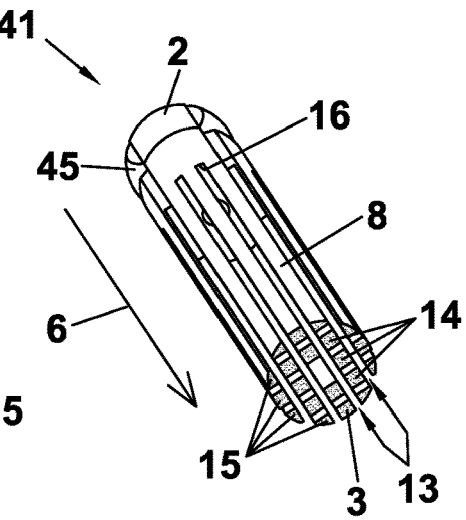
FIG. 4c
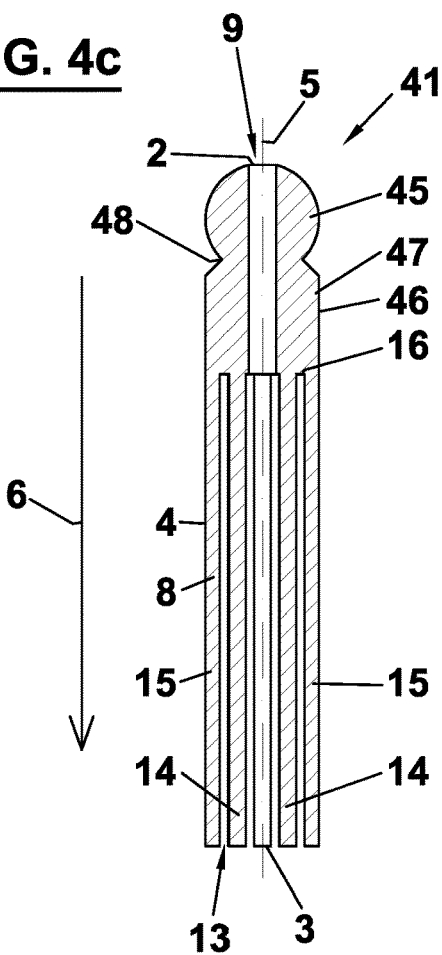
FIG. 4d

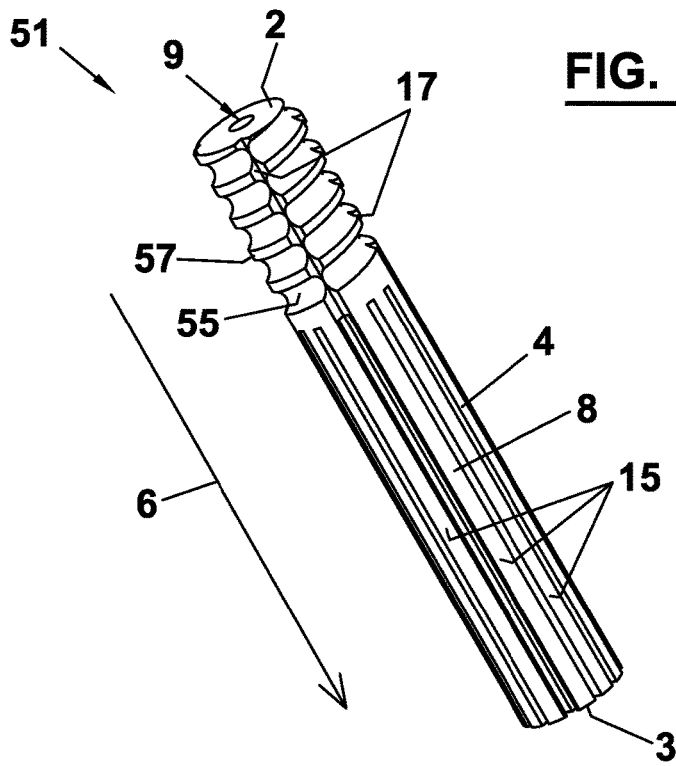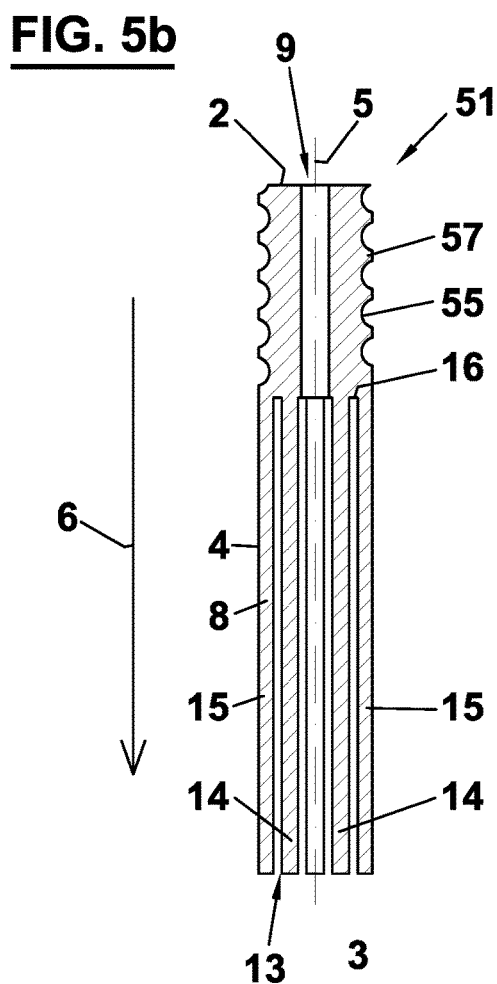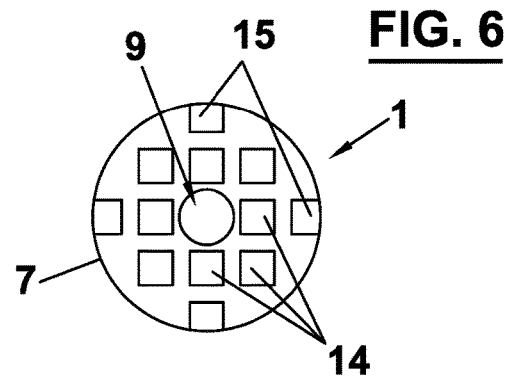

DENTAL POST, METHOD FOR ITS FABRICATION, AND SET OF DENTAL POSTS

CROSS-REFERENCE TO A RELATED APPLICATION

The present application claims priority to European Patent Application No. 18178865.4, filed Jun. 20, 2018, the content of which is incorporated herein by reference.

TECHNICAL FIELD

The present invention relates to a dental post configured to be fitted within a dental cavity of a tooth being restored. The post comprises a head portion and a foot portion consecutively arranged in an axial direction of the post, the axial direction being defined as a direction in which a central axis of the head portion extends. The foot portion comprises a free lower end such that the post can be inserted into the dental cavity in the axial direction of the post with the lower end inwardly facing a closed inner end of the dental cavity. At least the foot portion is composed of a composite material comprising a resin matrix reinforced with fibers. The invention further relates to a method of fabrication of such a dental post, and to a set comprising at least two such dental posts.

BACKGROUND OF THE INVENTION

A dental post of that type is know from EP 2 281 524 A1 to the same applicant. Typically, a dental crown can be secured to the head portion of the post after the post has been fitted with its foot portion within a dental cavity such as a pre-prepared tooth root canal. For this purpose, the foot portion of the post must be fixed with sufficient strength and at a sufficient depth of the tooth root canal. Such a fixation is typically accomplished by application of a fixing cement or another suitable bonding material in between an inner surface of the dental cavity and an outer surface of the foot portion of the post.

Yet a proper fixation of this previously known post inside a dental cavity has some undesired limitations. On the one hand, the shape of a dental cavity, and particularly of a tooth root canal, is subject to considerable natural fluctuations. Those fluctuations result, for instance, in variations of the cross sectional shape of the dental cavity or differing longitudinal cavity shapes that often deviate from an idealized rectilinear extension in the depth direction of the cavity. For instance, an oval-shaped cavity cross section or a cavity extending in a curved form, in particular at an inner end portion of the tooth root canal, may occur. Those more or less prominent differences in the shape of different dental cavities complicate the fitting and fixation of the dental post having a predetermined shape such as in particular a circular cross section and a rectilinear extension in its axial direction, thus being not optimally suited for a fitting inside an oval or curved cavity.

On the other hand, another limiting factor of the fixation strength of the dental post inside the dental cavity is determined by the respective size of the inner bonding surface of the dental cavity and the outer bonding surface of the dental post that are fixed together by the fixing cement. An enlargement of the outer bonding surface of the dental post has been proposed in EP 2 281 524 A1 by a provision of retention grooves on the outer surface yielding an improved retention of the post inside the cavity. But a further improvement of the bonding strength would be highly desirable.

SUMMARY OF THE INVENTION

It is an object of the present invention to remedy at least one of the above mentioned disadvantages and to provide the initially addressed dental post with an improved adaptability to the varying shapes of dental cavities. It is a further object to allow an improved fitting and/or fixation of the post inside the dental cavity. It is another object to assimilate the post to the properties of natural dentine. It is yet another object to facilitate the mounting procedure of the dental post, in particular during an endodontic or reconstructive tooth therapy.

At least one of these objects is achieved by the dental post according to claim 1 and/or the set of dental posts according to claim 14 and/or the fabrication method according to claim 15. The dependent claims define preferred embodiments.

Accordingly, the invention suggests that the foot portion of the dental post comprises a plurality of rods being separated from one another along the axial direction of the post such that each rod is preferably individually bendable in a transverse direction to the axial direction of the post. In this way, the flexibility of the dental post can be advantageously increased at its foot portion allowing a better adaptability to various shapes of a dental cavity during the fitting and fixation of the dental post within the dental cavity. In particular, a tooth reconstruction procedure can thus be highly facilitated, because no preceding shaping procedure of the cavity size with respect to a specific geometry of the dental post may be required, such as a shaping of the tooth root canal to a predetermined post shape by a calibrating reamer. Moreover, the bonding surface of the foot portion can be advantageously increased by the outer surface of the respective rods as compared to the outer surface of a conventional dental post such that an increased contact surface to a fixing cement and an improved fixation of the dental post inside the dental cavity can be provided.

Preferably, the rods have a width perpendicular to the axial direction of the post in the range 0.1 mm to 0.5 mm, preferably 0.2 mm to 0.3 mm (1 mm=1 millimeter). Another feature may be a cross-sectional area of a rod in the range 0.01 $mm^2$ to 0.25 $mm^2$, preferably in the range from about 0.04 $mm^2$ to about 0.09 $mm^2$. Rods with such a width have been found on the one hand to provide a sufficient structural strength and also a desired degree of stiffness that is beneficial for a simple insertion and advancement of the post inside the dental cavity. On the other hand, such a width of the rods can provide a sufficient flexibility of the foot portion. An application of specific materials from a variety of applicable materials may allow a narrower specification or may also lead to a slight change of those preferred parameter ranges. The number of rods provided in the foot portion can then be advantageously chosen in dependence of the desired total width of the post, which may depend on the respective application of the post. In particular, a width of the foot portion in a range in between 0.5 mm and 5 mm has been found to be suitable for such a dental post.

The plurality of rods of the foot portion thus corresponds to at least two rods. The foot portion consisting of two rods may already provide a noticeably increase of the adaptability of the post within a dental cavity. This may be ensured due the composite material of the foot portion preferably having material properties by which a desired flexibility of the rods is enhanced. Preferably, the foot portion comprises at least four rods. In this way, an approximately equal amount of flexibility of the foot portion may be achieved in all spatial directions transverse to the axial direction of the post. In a preferred configuration, in particular for a dental post having a width of at least 0.5 mm, the foot portion comprises at least eight rods. For such a foot portion, a sufficient flexibility has been determined for varying cavity shapes during the course of the present invention. In another preferred configuration, in particular for a dental post having a width of at least 1 mm, the foot portion comprises at least fifteen rods. It has been found that a foot portion having those properties not only can provide an improved flexibility during fitting of the post inside a dental cavity but can also contribute to an improved assimilation of the dental post mounted inside the dental cavity with respect to natural tooth properties, in particular with respect to a similar modulus of elasticity as natural dentine in a range between 15-25 GPa. Especially with respect to an improved fixation of the post inside a tooth root canal having a comparatively large cavity volume, a foot portion preferably comprising at least twenty rods has been found to be even more appropriate, in particular for a dental post having a width of at least 1.5 mm.

In principle, the degree of flexibility of the foot portion increases with a reduced thickness of the rods and thus with the number of rods provided in the foot portion for a predetermined width of the post. Yet a very large number of rods can jeopardize the structural stability of the foot portion and may also constitute a considerable cost factor during manufacturing of the post. In addition, too much flexibility of the foot portion may also complicate the insertion of the post inside the dental cavity. Moreover, a desired assimilation of the elastic properties of the post with respect to the properties of natural dentine may be compromised if the total number of rods in the food portion exceeds a critical number and the resulting individual rods are too thin. In a preferred configuration, the foot portion thus preferably comprises at most fifty rods. In particular with respect to a desired assimilation of the dental post mounted inside the dental cavity to a similar modulus of elasticity as natural dentine, a foot portion preferably comprising at most thirty rods has been found to be appropriate, in particular for a dental post having a width of at least 0.5 mm. A range of numbers of rods which have been found particularly suited is from 3 to 15 rods.

Preferably, the rods comprise an upper end affixed to a bottom face of the head portion. The bottom face of the head portion is preferably provided by a substantially flat surface, in particular by a surface extending perpendicular to the axial direction of the head portion. The upper ends of the rods are preferably homogenously distributed over the bottom face of the head portion, in particular such that the upper ends of neighboring rods are substantially equidistantly spaced from one another. This can contribute to isotropic bending and fixation properties of the foot portion. In a preferred configuration, the bottom face of the head portion has a width perpendicular to the axial direction of the post substantially corresponding to a width of the foot portion at the upper end of the rods. This can allow a continuous and solid fixation of the post inside the cavity being effective over the complete cross sectional area of the head portion. In a preferred configuration, the rods have a total cross section at their upper end corresponding to a sum of cross sections of the upper end of all rods provided in the foot portion, the total cross section at the upper end of the rods being at most 20%, preferably at most 10% smaller, than a cross section of the bottom face of the head portion to which the rods are affixed.

In a preferred configuration, at least a part of the rods of the foot portion have a substantially identical cross section, in particular over at least half of the length, more preferred over the total length, of the foot portion in the axial direction of the post. Such a mutually corresponding shape of at least half of the rods can contribute to an isotropic bending behavior of the foot portion during insertion and advancement within a dental cavity. Preferably, at least one third, more preferred at least half, of the rods of the foot portion have such an identical cross section.

In a preferred configuration, at least a part of the rods have a cross section being substantially uniform and preferably constant along their entire length in the axial direction of the post. Preferably, at least half of the rods, more preferred at least two third of the rods and even more preferred all of the rods, have such a uniform or constant cross section. This can further contribute to an isotropic bending behavior of the foot portion. In another configuration, at least a part of the rods have a cross section that decreases in the axial direction of the post toward the lower end of the foot portion. Such a decreasing cross section of the rods may be beneficial during insertion of the post into a tapering cavity.

In a preferred configuration, at least a part of the rods have a substantially rectangular cross section. Such a rectangular shape can provide an outer surface area of the respective rods that is maximized, thus contributing to an improved fixation and therefore a higher retention of the dental post inside the cavity by means of a fixing cement surrounding the rods. Moreover, a substantially equidistant spacing in between neighboring rods can thus be provided. In particular, a substantially square shaped cross section of the respective rods is preferred. In other configurations, also other shapes of the cross section of the respective rods are conceivable, such as an elliptic or circular cross section.

Preferably, the plurality of rods is separated by cut-outs of the foot portion in between the rods. Preferably, the cut-outs have a width perpendicular to the axial direction of the post, the width providing a spacing in between the rods. In particular, the spacing between the rods is provided in a state of the rods in which the rods are in an unbent state, in particular in a state in which the rods extend in the axial direction of the head portion. Generally, the number of slits in one direction (i.e. the number of slits in a group of substantially parallel slits) is preferably in the range 4 to 6. The width of the cut-outs is preferably at least 1 μm (0.001 mm), more preferred at least 5 μm (0.005 mm) and even more preferred at least 10 μm (0.01 mm). Preferably, at least a part of the cut-outs extend through an entire cross section of the foot portion perpendicular to the axial direction and in parallel thereto. In this way, the flexibility and adaptability of the post can be increased. Yet a proper fixation of the post inside the cavity and also a desired assimilation of the elastic properties of the post with respect to the properties of natural dentine may be compromised if the cut outs are too thick resulting in a large free space in between the rods to be filled by a fixing cement during installation of the post. The width of the cut-outs is therefore preferably at most 0.500 mm, more preferred at most 0.200 mm and even more preferred at most 0.100 mm. According to another preferred aspect, the rods of incomplete cross-section are removed, so that only rods of substantially the same cross-section are present. "The same cross-section" may include rods having a cross-section area of at least 75%. 80%, 85%, 90%, 95%, or 99% of the complete or maximal cross-section of a rod with increasing preference.

In a preferred configuration, the cut-outs are substantially planar. The cut-outs thus preferably comprise a substantially flat surface along their direction of extension in between the rods. Preferably, the planar cut-outs extend in the axial direction of the post, in particular such that said flat surface is oriented in parallel to the axial direction. Preferably, the planar cut-outs extend in a direction perpendicular to the axial direction of the post, in particular such that said flat surface is oriented in said direction perpendicular to the axial direction.

In a preferred configuration, two groups of the planar cut-outs are provided, wherein the cut-outs of each group extend in parallel to one another. The cut-outs of a different group of the groups of cut-outs preferably extend in a different direction perpendicular to the axial direction of the post, in particular such that said flat surfaces of the cut-outs of a different group are oriented in a different direction perpendicular to the axial direction. Preferably, the cut-outs of a different group of said groups of cut-outs are perpendicular to one another, in particular such that said flat surfaces of the cut-outs of a different group are oriented perpendicular to one another. In this way, a substantially checkered cross section of the foot portion is preferably provided by the cross-sections of the rods separated by the cut-outs.

Preferably, the head portion is adapted for the mounting of a dental crown, in particular on an outer surface of the head portion. For this purpose, the head portion preferably comprises an enveloping surface extending in the axial direction of the post, wherein the enveloping surface is substantially rotationally symmetric around the central axis of the head portion. The enveloping surface is preferably defined by a virtual continuous surface surrounding the head portion along radially outwardly facing edges and/or outwardly facing surfaces of the head portion. In an embodiment, the enveloping surface of the head portion has a substantially cylindrical shape, in particular a circular cylindrical shape, wherein a central axis of the cylinder corresponds to the central axis of the head portion. In another embodiment, the enveloping surface of the head portion may comprise a spherical and/or elliptical shape.

In a first preferred configuration, the head portion comprises a substantially continuous outer surface, such that the enveloping surface of the head portion substantially corresponds to the outer surface of the head portion. In a second preferred configuration, the head portion comprises an outer surface in which surface structures, in particular surface reductions and/or elevations, are provided, such that the enveloping surface of the head portion corresponds to a virtual continuous surface surrounding the head portion along radially outwardly facing surface portions which are neighboring the surface structures. Preferably, the surface structures are adapted to provide a retention for a dental crown for an improved fixation of the dental crown on the head portion. In particular, the surface structures may be provided as substantially rectilinear retention grooves and/or helically retention grooves.

Preferably, the foot portion has a length in the axial direction of the post that exceeds a length of the head portion in the axial direction of the post by at least a factor of 1.5, more preferred by at least a factor of 2. In this way, an advantageous bonding of the post at a sufficient depth of the dental cavity can be provided. In a preferred configuration, the rods have a length in the axial direction of the post of at least 10 mm, more preferred at least 15 mm, and even more preferred at least 20 mm. In this configuration, the head portion preferably has a length in the axial direction of the post of at least 3 mm, more preferred at least 5 mm, and even more preferred at least 8 mm, in order to provide a sufficient mounting body for a dental crown. For the same reason, the head portion preferably has a diameter perpendicular to the axial direction of the post of at least 0.3 mm, more preferred at least 0.5 mm, and even more preferred at least 1 mm.

In a preferred configuration, neighboring rods are spaced from one another in a direction perpendicular to the axial direction of the post. In particular, the spacing between the rods is provided in a state of the rods in which the rods are in an unbent state, in particular in a state of the rods before an insertion of the foot portion into an arbitrary formed dental cavity causing a bending of at least part of the rods away from the axial direction. Preferably, an empty space defining a distance of at least 1 µm (0.001 mm), more preferred at least 5 µm (0.005 mm) and even more preferred at least 10 µm (0.01 mm), is provided in between neighboring rods at least over part of the length of the rods in the axial direction of the post. In particular, the empty space may be provided at the upper end of the rods affixed to the bottom face of the head portion and/or at the free lower end of the rods. Preferably, the empty space substantially extends over the total length of the rods in the axial direction of the post. Such an empty space can further improve the adaptability of the post inside the dental cavity and can be useful for the provision of a fixing cement in between the rods, thus allowing a stronger fixation inside the cavity. Preferably, a substantially equidistant spacing is provided in between at least half, more preferred at least two third, of mutually neighboring rods.

In a preferred configuration, at least one hole is provided in the foot portion. The hole preferably constitutes an empty space into which the rods can be displaced and/or in which a fixing cement can be filled. Thus, the hole can increase the flexibility of the post and can contribute to the fixation of the post inside the cavity. The hole preferably extends in the axial direction of the post. In the configuration in which neighboring rods are spaced from one another, the hole preferably has a width perpendicular to the axial direction of the post which is larger than the spacing in between the rods. Preferably, the hole has a width of at least 0.1 mm, preferably a width of at most 0.6 mm and even more preferred in the range 0.2 to 0.4 mm. The hole preferably extends over the complete length of the rods, in the axial direction of the post. The hole preferably extends in parallel to the rods. The hole preferably has a circular or elliptic cross section. Also a rectangular or squared cross section is conceivable. The hole is preferably provided at a center of the foot portion such that it is equidistantly spaced from a circumferential surface of the foot portion. Preferably, the hole is provided by a bore, in particular a central bore. More preferably, the hole is drilled in the post from the bottom before the cut-outs for creating the rods are provided. Alternatively, the hole may be obtained by removing rods. It is even conceivable to have more than one hole.

In a preferred configuration, at least one hole extends into the head portion of the post. The hole preferably continues from the foot portion to the head portion, in particular in the axial direction. In this way, an inner surface of the head portion can be provided. The inner surface can be exploited as an additional contact surface for a fixing cement such that also the head portion can contribute to a fixation of the post inside a dental cavity. In an embodiment, the hole extends over a complete length of the head portion. An aperture is preferably provided at an upper face of the head portion such that the hole is open at the upper face. The aperture can serve as an outflow channel for a fixing cement, in particular in a situation in which an excess amount of fixing cement has been applied within the cavity.

Preferably, the foot portion comprises an enveloping surface extending in the axial direction of the post. The enveloping surface of the foot portion is preferably defined by a virtual continuous surface surrounding the foot portion along radially outwardly facing edges and/or outwardly facing surfaces of rods, in particular of the part of the rods that are arranged around a circumference of the foot portion. Preferably, a circumference of the enveloping surface at an upper end of the rods affixed to a bottom face of the head portion corresponds to the circumference of the bottom face of the head portion. The enveloping surface at the upper end of the rods thus preferably has a width perpendicular to the axial direction of the post substantially corresponding to a width of the bottom face of the foot portion. In this way, a solid fixation of the post over the total cross sectional area of the head portion can be achieved.

The enveloping surface of the foot portion preferably encloses a volume, wherein the rods have a total volume corresponding to a sum of volumes of all rods provided in the foot portion. In a preferred configuration, the total volume of the rods is at least 80%, preferably at least 90%, of the volume enclosed by the enveloping surface. Of course, this is equivalent to the total proportion of rods of the cross-sectional area provided this proportion is about constant over the length of the post as shipped. Still to be mentioned that the volume used by the hole is not considered in calculating the proportion of the volume fractions.

The difference between the volume enclosed by the enveloping surface and the total volume of the rods is preferably at least partially provided by the spacing in between neighboring rods, in particular the cut-outs between the rods, and/or the hole provided in the axial direction. In this way, the flexibility and adaptability of the post can be increased.

In a preferred configuration, at least a part of the rods comprises a curved surface portion. In particular, at least a part of the rods which are arranged around a circumference of the foot portion comprise a radially outward pointing surface portion having a curved shape. Such a curved outer surface portion can facilitate an insertion and an advancement of the foot portion within a dental cavity. Preferably, the curved surface portions of the rods are chosen such that a continuous enveloping surface of the foot portion extending in the axial direction of the post is defined by the curved surface portions. In particular, a cylindrical enveloping surface, more preferred a circular cylindrical enveloping surface, may be defined by the curved surface portions. Alternatively or supplementary, at least a part of the rods comprises a radially inward pointing surface portion having a curved shape. Such an inwardly curved surface can provide an additional space in between neighboring rods providing an increased flexibility of the foot portion.

Preferably, the head portion is provided with a plurality of surface structures. The surface structures can facilitate a fixation of a dental crown at the head portion. In a preferred configuration, the surface structures extend in the axial direction of the post. In particular, the surface structures may be provided as rectilinear reductions at the outer surface of the head portion. The rectilinear reductions preferably extend in parallel to the axial direction. The rectilinear reductions are preferably equidistantly spaced around the circumference of the post.

Preferably, the foot portion is provided with a plurality of surface structures. The surface structures of the foot portion can further improve a fixation of the post inside a dental cavity. In a preferred configuration, the surface structures extend in the axial direction of the post. In particular, the surface structures may be provided as rectilinear reductions at the outer surface of the foot portion, in particular at a radially outward pointing surface of rods of the foot portion. The rectilinear reductions preferably extend in parallel to the axial direction. The rectilinear reductions are preferably equidistantly spaced around the circumference of the post. In a preferred configuration, at least a part of surface structures having a corresponding shape and/or circumferential position are provided at the outer circumference of the head portion and the foot portion.

According to the invention, the advantageous flexibility and adaptability properties of the dental post are provided on the one hand by the number and/or geometry and/or spacing of the rods of the foot portion and on the other hand by the material composition of the foot portion. To this end, the foot portion is composed of a composite material comprising a resin matrix reinforced with fibers. Preferably, also the head portion is composed of a composite material comprising a resin matrix reinforced with fibers, in particular of substantially the same material as the foot portion. Thus, the fabrication of the post can be highly facilitated.

Moreover, such a material composition of the dental post can be exploited for a number of additional advantages. In particular, the material composition can be exploited for a high degree of radiopacity and/or photochromic properties and also to ensure good optical properties, in particular to provide good light conduction properties through the post. The material can further ensure a good biocompatibility of the dental post after its mounting inside a cavity of a natural tooth. The material composition can further be exploited to mimic the properties of natural dentine in a number of ways, in particular with respect to the modulus of elasticity. Even though the post is already adapted to comply with a large variety of naturally occurring cavity shapes, the material may be exploited to rework the shape and size of the post, for instance a reshaping of the head portion after fixation of the foot portion inside the cavity, in particular by grinding or cutting of a surface of the dental post.

Generally, a number of different materials of the fiber and/or resin matrix constituents of the dental post are conceivable. For instance, the material of the resin may be selected from methyl methacrylate (MMA), urethane dimethacrylate (UDMA), BIS-GMA (bisphenol A-glycidyl methacrylate), epoxy resin, PEEK, polyester, polyvinyl ester, or a mixture thereof. The material of the fibers may be selected from glass, quartz, carbon, aramide, kevlar or a mixture thereof. Moreover, a wide range of different compositions of the fiber content with respect to the resin content of the dental post is conceivable. Advantageously, the individual properties of these materials and of their relative composition can be exploited to adapt the dental post with respect to the specific requirements of the respective dental structure to be replaced.

A preferred material composition at least of the foot portion of the dental post comprises a resin that is derived from at least one methacrylate monomer, in particular methyl methacrylate (MMA) and/or urethane dimethacrylate (UDMA). Besides a high biocompatibility, a good bonding interaction between the dental post and the inner cavity surface can be expected from this material selection due to a chemical composition that resembles currently used composite resin cements that are used for fixing prosthetic devices in dentistry. Such a resin material can further account for a desired flexibility of the foot section and/or an adaption of the dental post to natural tooth properties. Preferably, also the head portion comprises a resin formed from such a material, in particular to allow a good bonding interaction with a dental crown.

In a preferred configuration, the resin matrix is reinforced with substantially uniformly directed fibers. The fibers preferable extend through a total length of the dental post, in particular from an upper face of the head portion to a lower end of the foot portion. More generally, various possibilities of the arrangement of the fibers within the resin are conceivable. According to a first preferred configuration, at least a part of the fibers is substantially uniformly directed in parallel with respect to the axial direction. According to a second preferred configuration, at least a part of the fibers is arranged in the manner of a braided netting in a biaxial or multi-axial orientation. An arrangement of the fibers according to these configurations can further contribute to improve the flexural strength of the dental post. According to a third configuration, the fibers are not directed in a preferential direction, in particular they are randomly distributed in the resin matrix.

Preferably, a uniform orientation of the fibers in the axial direction and/or a longitudinal extension of the fibers through a total length of the post in the axial direction within the resin is exploited in such a way, that an anisotropic modulus of elasticity is provided. Thus, the dental post preferably exhibits a modulus of elasticity that varies in dependence of the direction of a force applied on the post with respect to the axial direction. In this way, the inherent properties of the natural two-layer system between the enamel and the dentine can be further assimilated. More precisely, an anisotropic behavior of the modulus of elasticity of natural enamel and dentine has been reported in various scientific studies. Such an anisotropic behavior of at least one layer of a multilayered biological system is believed to contribute to a protection against breakage or rupture of the system. The dental post according to the invention can be used to mimic the anisotropic elastic modulus of one layer of such a natural system. Moreover, a homogenous and therefore predictable behavior can be achieved over the whole length of post by such a uniform fiber orientation.

In order to reduce the risk of breakage of the dental post, the post preferably exhibits a varying modulus of elasticity. Moreover, the elastic properties of natural dentine can thus be imitated. Preferably, the modulus of elasticity is lower for a force applied perpendicular to the axial direction of the post as compared to a force applied in parallel with respect to the axial direction. Preferably, the fiber content is chosen in such a way, that a variation of the elastic modulus of at least 10 GPa, more preferred at least 30 GPa is achieved. Furthermore, the fiber content is preferably chosen in such a way, that a variation of the elastic modulus of at most 100 GPa, more preferred at most 40 GPa is achieved. In a preferred configuration, the fiber content is chosen such that the post exhibits a modulus of elasticity of at least 10 GPa and at most 50 GPa.

To provide a dental post that optically resembles to the properties of natural dentine, in particular to render the post aesthetically more pleasing, the fibers are preferably constituted by glass fibers. For instance, E glass, S glass and/or AR Glass fibers are conceivable for that purpose. "E", "S", and "AR" are known abbreviations in connection with glass types of glass fibers meaning "electrical" (="E"), "strength" (="S"), and "alkali resistant ("AR"). A known E glass is alumino-borosilicate glass with less than 1 wt.-% alkali oxides. A known S glass is aluminosilicate glass without CaO but with high MgO content. This glass is characterized by a high tensile strength. AR glass features an improved resistance to alkali.

To further assimilate the dental post to the optical properties of natural dentine, mineral particles are preferably embedded in the resin, wherein the content by volume of said mineral particles is matched in such a way that the index of refraction of said body portion is in between 1.3 and 1.8, more preferred in between 1.4 and 1.6. Most preferred, an index of refraction in between 1.50 and 1.55 is achieved by an appropriate composition of the resin, fibers and mineral particles in order to closely imitate the appearance of natural dentine.

Another prerequisite of the dental post may be its radiopacity (opacity to radiation) to allow a dentist to monitor the artificial tooth structure by X-ray analysis. In order to provide this property, X-ray absorbing particles are preferably embedded in the resin, the X-ray absorbing particles being selected from a chemical compound comprising an element of an atomic number of at least 37, more preferred at least 57. Advantageously, the X-ray absorbing particles may be provided in the form of mineral particles for matching the refractive index of the post, as described above. Preferably, particles selected from an ytterbium compound are employed for this purpose, in particular ytterbium fluoride and/or ytterbium oxide.

In order to achieve the above described properties with respect to an adaption of the dental post to natural dentine and by still ensuring a high flexural strength of the post, a fraction of at least 40% in volume of the material of the post is preferably constituted by the fibers. More preferred, the fiber content represents ideally at least 70% of the volume, even more preferred about 80% of the volume of the material. This material can provide excellent fatigue properties under repeated stress. A further improvement of the flexural strength and the elastic properties of the post can be achieved by pre-tensioning the fibers during the manufacturing process, in particular by a tension force of at least 100 N, more preferred at least 300 N. Such a tensioning of the fibers can be advantageously implemented during a fabrication process that is carried out by means of pultrusion.

In order to improve the bonding interaction between the fibers and the resin, the circumferential surface of the fibers is preferably covered with a coupling agent, in particular silane, for enhancing the adhesion of said fibers to the resin. On the one hand, such a treatment of the fibers contributes to increase the interlaminate shear strength (ISS) of the dental post. In this way, an ISS-value of at least 80 MPa, in particular about 90 MPa or higher, can be achieved, resulting in a further improvement of the fatigue properties under repeated stress. On the other hand, a delamination of the post can be effectively avoided, in particular during a reworking of the prefabricated shape of the dental post, for instance by grinding or cutting the surface of the head portion by means of diamond burs or discs. This advantageously allows adapting the shape of the head portion to specific requirements of a dental crown to be attached, even after it is fixed inside a dental cavity. Despite a smooth workability, a high flexural strength of the post can be achieved, in particular in the range of 1500 MPa or higher, due to the continuous longitudinal arrangement of the fibers. Thus, the post can be highly resistant against fracture, bending or rupture and can provide a long durability.

In a preferred configuration, at least a fraction of the fibers is adapted for light conduction within the post. Preferably, due to their uniform arrangement within the post, the light conducting fibers are substantially directed from the upper face of the head portion to the lower end of the foot portion, in particular to the lower face of the rods. This allows to exploit the superior light conducting properties of fibers, such as glass fibers or optical fibers, as compared to the light conduction through the resin material, for a light conduction through the post. In particular, light can thus be reliably conducted from the upper end to the lower end of the post even after bending of the foot portion inside a dental cavity. Preferably, the post thus consists of fiber-reinforced material, wherein the reinforcement fibers may be silica and/or glass and/or carbon and/or quartz fibers. For ensuring the desired optical properties the use of optical fibers, in particular glass and/or silica fibers, as a dominating constituent is preferred.

For facilitating light coupling into the fibers, the invention suggests that ends of the light conducting fibers at the upper face of the head portion are prepared as a light entering surface. This may be achieved by a planar cutting of the fibers. In addition, the fibers may be grinded and/or polished at the first end for achieving a superior coupling. Furthermore, the fibers may be provided with a coating at the first end which allows improved coupling of light into the fibers. Preferably, a fraction of at least 40% and at most 80% in volume of the total content of the dental post is constituted by the fibers in order to ensure sufficient light conduction through the post. In order to achieve a uniform distribution of light irradiation at the lower faces of the rods, the fibers are preferably homogeneously distributed within the post.

In a preferred implementation of the invention, a set of dental posts comprising at least two dental posts is provided, wherein the width of the head portion perpendicular to the axial direction varies for different dental posts. In particular, the width of the head portion in such a set may be in a range in between at least 0.3 mm and at most 8 mm, more preferred in between at least 0.5 mm and at most 5 mm, for different posts. Such a set of posts can be useful to provide a further adaption to various dental cavity sizes and shapes by selecting a post having a most appropriate size and shape for a particular cavity from the set of posts. In such a set, the number of rods of the foot portion of the post preferably also varies for different posts. In particular, the number of rods may range in between at least two and at most ten rods for the post with the smallest width to at least fifteen rods, more preferred at least twenty rods, for the post with the largest width. Preferably, at least a number of rods of different posts with a different width of their head portion in such a set have a substantially equal width perpendicular to the axial direction, more preferred a substantially equal cross section perpendicular to the axial direction. In this way, uniformly adapted bending and fixation properties can be provided for different posts in such a set.

According to another aspect of the invention, a method for fabricating a dental post is proposed. The method comprises the first step of providing a solid cylindrical body, in particular a circular cylindrical body, consisting of the composite material. The method comprises the second step of cutting the body over a partial length of the body in parallel to the axial direction. In this way, the rods are preferably separated from one another at said partial length of the body by said cutting. Said partial length of the body preferably forms the foot portion of the dental post.

The first step of the method preferably comprises the step of forming a composite body of uniform or preferably constant, cross-section with substantially uniformly directed fibers in a pultrusion process. Preferably, the pultrusion process comprises pulling the fibers through a resin impregnation bath comprising at least one of a X-ray absorbing material and mineral particles. The circumferential surface of the body, in particular cylindrical surface, may be shaped using a turning lathe.

The second step of the method preferably comprises the step of cutting a hole in the axial direction of the cylindrical body. The hole preferably extends at least through the partial length of the composite body forming the foot portion of the dental post. More preferred, the hole also extends into a remaining length of the body forming the head portion of the post, in particular through the total length of the post. The hole is preferably provided by a central bore extending through the central axis. Preferably, the hole is cut by a cylindrical cutting tool. The hole is preferably employed as a fastening means for the composite body during a cutting of the rods in the foot portion of the post. Preferably, the cutting of the hole is thus executed before said separation of the rods.

Preferably, said separation of the rods by cutting is preferably executed with a rectilinear and/or planar cutting tool. The cutting tool is preferably advanced from the lower end of the foot portion in parallel to the axial direction. In this way, a plurality of planar cut-outs is preferably provided extending in parallel to the axial direction. More preferred, two groups of planar cut-outs are provided in such a manner, wherein cut-outs of different groups are perpendicular to one another. In this way, a substantially checkered cross section of the foot portion is preferably provided by the cross-sections of the rods separated by the planar cutting. Preferably, a polycrystalline or diamond coating is applied on the cutting tool for avoiding delamination effects of the fibers.

BRIEF DESCRIPTION OF THE DRAWINGS

The invention is explained in more detail hereinafter by means of preferred embodiments with reference to the drawings which illustrate further properties and advantages of the invention. The following description of the preferred embodiments is not intended as a limitation of the scope of the invention that has been described more generally above and is solely defined by the claims. The figures, the description, and the claims comprise numerous features in combination that one skilled in the art may also contemplate separately and use in further appropriate combinations. In the drawings:

FIGS. 2(a)-(c) show a perspective view, a longitudinal sectional view, and a cross sectional view of a second embodiment of a dental post according to the invention;

FIGS. 3(a)-(c) show a perspective view, a longitudinal sectional view, and a cross sectional view of a third embodiment of a dental post according to the invention;

FIGS. 4(a)-(d) display perspective views, a longitudinal sectional view, and a cross sectional view of a fourth embodiment of a dental post according to the invention;

FIGS. 5(a)-(c) show a perspective view, a longitudinal sectional view, and a cross sectional view of a fifth embodiment of a dental post according to the invention;

FIG. 6 shows a bottom view as any of FIG. 1d or FIG. 5c, where only rods within the diameter of the post and of substantially complete cross-section are present;

DESCRIPTION OF PREFERRED EMBODIMENTS

Figure 1A:
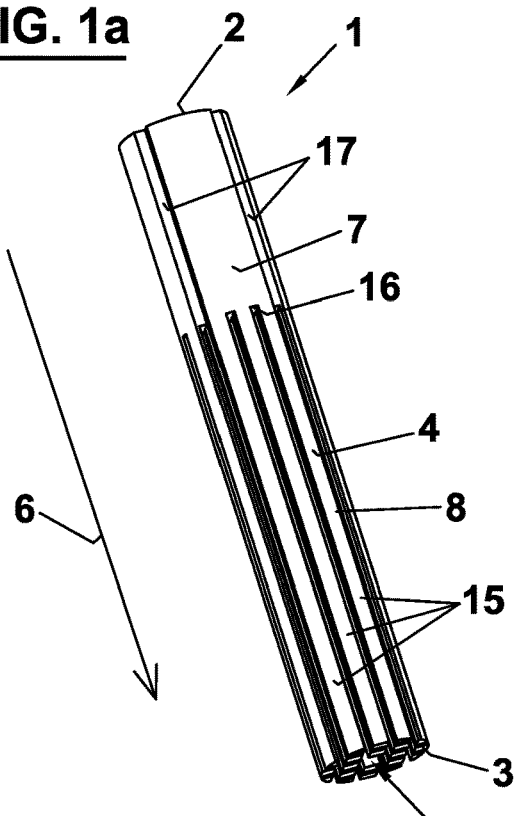
FIGS. 1(a)-(d) display perspective views, a longitudinal sectional view, and a cross sectional view of a first embodiment of a dental post according to the invention.
Figure 1B:
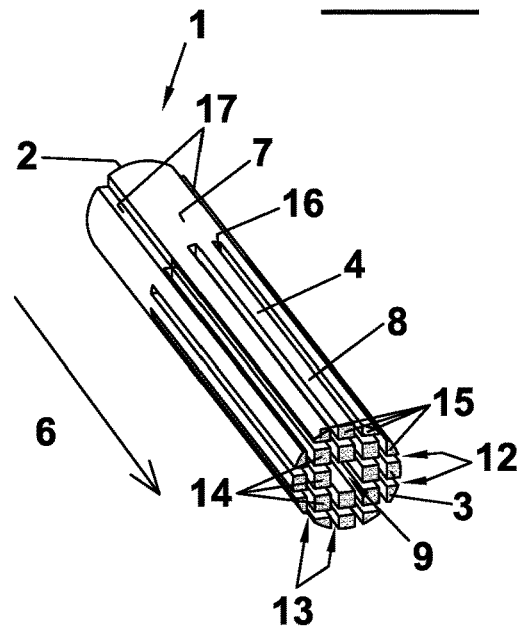
Figure 1C:
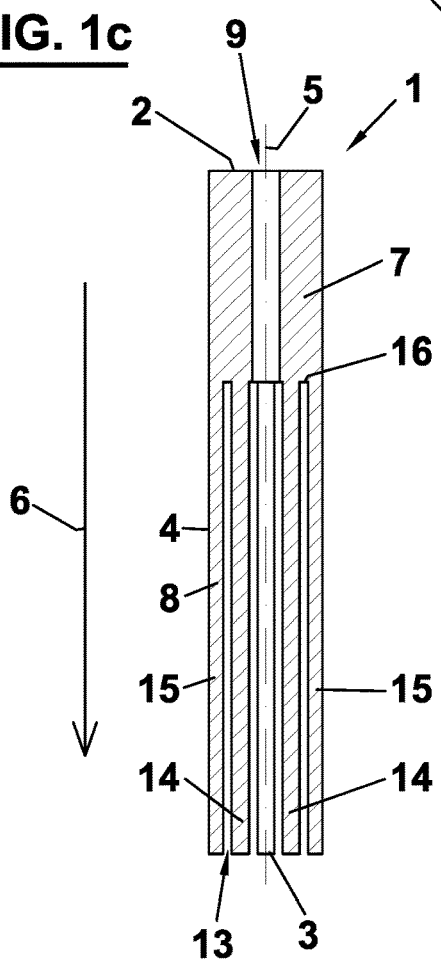
Figure 1D:
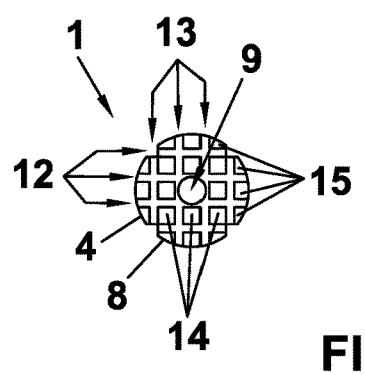

A dental post 1 according to a first embodiment, as depicted in FIGS. 1(a)-(d), is formed from a solid piece of a circular cylindrical body. The body is composed of a composite material comprising a resin matrix that is reinforced with fibers. The fibers extend from a free upper end 2 to a free lower end 3 of post 1 over a total length of post 1. The fibers are uniformly directed in parallel with respect to a central axis 5 of post 1. The fibers thus extend in an axial direction 6 pointing in the direction of central axis 5 of post 1. The resin consists of a polymer derived from a methacrylate monomer, preferably methyl methacrylate (MMA) or urethane dimethacrylate (UDMA). Mineral particles, preferably ytterbium fluoride and/or ytterbium oxide, are homogenously distributed within the resin. The fibers are constituted by glass fibers, wherein the fiber content represents ideally 80% of the volume of post 1. The fibers are treated with silane as a coupling agent to the resin matrix. An enveloping surface 4 of post 1, which is outwardly pointing in a radial direction as seen from central axis 5 and extending in axial direction 6, substantially corresponds to the shape of the cylindrical body from which post 1 is formed.

Post 1 comprises a head portion 7 and a foot portion 8 consecutively arranged in axial direction 6 of post 1. Head portion 7 has a length of at least 1 cm and at most 3 cm in axial direction 6. Foot portion 8 has a length of at least 1 cm and at most 5 cm in axial direction 6. Foot portion 8 is preferably at least 1 cm longer than head portion 8 in order to provide a stable fixation of post 1 inside a dental cavity. Head portion 7 and foot portion 8 have an equivalent width perpendicular to central axis 5. The width is at least 1.5 mm and at most 3 mm. An upper face of head portion 7 coincides with upper end 2 of post 1. A lower end of foot portion 8 coincides with lower end 3 of post 1. Central axis 5 defines a common central axis of head portion 7 and foot portion 8. The radially outwardly pointing surface 4 of foot portion 8 and head portion 7 is thus centered on central axis 5. The upper face 2 of head portion 7 is substantially flat. In this way, an entrance surface for light can be provided, at which light can be coupled into the fibers which are terminating at upper face 2 and can then be conducted from those fiber ends through the fibers extending through post 1 to lower end 3 of foot portion 8.

Post 1 comprises a central bore 9 forming a hole extending through the total length of post 1. Hole 9 has a constant cross section along its extension through head portion 7, the cross section having a circular shape. Hole 9 has a constant cross section along its extension through foot portion 8, the cross section having a square shape. The cross sectional area of hole 9 inside foot portion 8 is larger than the cross sectional area of hole 9 inside head portion 7. Hole 9 is centered around central axis 5. Hole 9 is cut out from the solid cylindrical body from which dental post 1 is formed.

Foot portion 8 further comprises a number of planar cut-outs 12, 13. Planar cut-outs 12, 13 are provided in a respective plane spanned by two vectors, the first vector pointing in axial direction 6 and the second vector having an orientation perpendicular to axial direction 6. In this way, a first group of slits extending through a total length of foot portion 8 in axial direction 6 is provided by cut-outs 12, and a second group of slits extending through a total length of foot portion 8 in axial direction 6 is provided by cut-outs 13. Slits 12, 13 further extend through a complete cross section of foot portion 8 perpendicular to axial direction 6. Slits 12 of the first group extend in parallel to one another, and slits 13 of the second group extend in parallel to one another. Neighboring slits 12 of the first group are equidistantly spaced from one another, and neighboring slits 13 of the second group are equidistantly spaced from one another. Each slit 12 of the first group is perpendicular to each slit 13 of the second group. Slits 12, 13 thus define a substantially checkered cross section of foot portion 8. In total, four slits 12 of the first group and four slits 13 of the second group are provided. Thus, a checkered cross section comprising twenty fields including hole 9 is provided. Slits 12, 13 have the same width perpendicular to axial direction 6.

The slits defined by planar cut-outs 12, 13 separate respective rods 14, 15 in foot portion 8 from one another along axial direction 6. The rods are composed of radially inner rods 14 and radially outer rods 15 with respect to central axis 5. Radially outer rods 15 are arranged around a circumference of foot portion 8 and are distinguished from radially inner rods 14 in that they comprise a surface portion of radially outwardly pointing surface 4 of foot portion 8. Radially outwardly pointing surface portion 4 of outer rods 15 is curved. The remaining inwardly directed surface portions of outer rods 15 are flat. Radially inner rods 14 comprise four flat surface portions oriented in a right angle to one another. Inner rods 14 thus have a square shaped cross section. Neighboring rods 14, 15 are equidistantly spaced from one another. Eight inner rods 14 are provided. Inner rods 14 are arranged around hole 9. Twelve outer rods 15 are provided. Outer rods 15 are arranged around inner rods 14. An upper end of rods 14, 15 is affixed to a bottom face 16 of head portion 7. The upper ends of rods 14, 15 are homogenously distributed over bottom face 16 the head portion 7. The lower faces of rods 14, 15 constitute together lower end 3 of foot portion 8. In this way, an emission surface for light can be provided, at which light can be emitted from the fibers which are terminating at lower end 3. The lower faces of rods 14, 15 extend in a common plane.

Outwardly pointing surface 4 of head portion 7 is substantially cylindrical, wherein a plurality of surface structures 17 is cut out from head portion 7. In total, four surface structures 17 are provided around outer surface 4 of head portion 7. Surface structures 17 are provided as rectilinear reductions extending in axial direction 6. Rectilinear surface reductions 17 are equidistantly spaced from one another around the circumference of outer surface 4. At the respective circumferential position of surface reductions 17 in head portion 7, planar cut-outs 12, 13 are provided in foot portion 8.

FIGS. 2(a)-(c) show a dental post 21 according to a second embodiment. Structural elements and constituent parts corresponding to the embodiment of dental post 1 depicted in FIGS. 1(a)-(d) are indicated by the same reference numbers. Subsequently, only the differences of dental post 21 with respect to dental post 1 are described.

Head portion 7 and foot portion 8 of post 21 have a smaller width perpendicular to central axis 5 as compared to post 1. The width of head portion 7 and foot portion 8 of post 21 is at least 0.5 mm and at most 2 mm. The slits provided by planar cut-outs 12, 13 in foot portion 8 of post 21, however, have the same width perpendicular to axial direction 6 and the same spacing from one another as compared to slits 12, 13 in foot portion 8 of post 1. Thus, as a result of the smaller width of post 21, foot portion 8 of post 21 only comprises eight radially outer rods 15 and four radially inner rods 24. Inner rods 24 of post 21 are further distinguished from inner rods 14 of post 1 in that they comprise a radially inwardly pointing surface portion that is curved. The curved radially inwardly pointing surface portion of inner rods 24 is formed by hole 9 having an identical circular cross sectional shape in foot portion 8 and in head portion 7.

FIGS. 3(a)-(c) show a dental post 31 according to a third embodiment. Structural elements and constituent parts corresponding to the embodiment of dental post 1 and 21 depicted in FIGS. 1(a)-(d) and FIGS. 2(a)-(c) are indicated by the same reference numbers. Subsequently, only the differences of dental post 31 with respect to dental post 1 and 21 are described.

Head portion 7 and foot portion 8 of post 31 have a smaller width perpendicular to central axis 5 as compared to post 1 and post 21. The width of head portion 7 and foot portion 8 of post 31 is at least 0.3 mm and at most 1 mm. The slits provided by planar cut-outs 12, 13 in foot portion 8 of post 21, however, have the same width perpendicular to axial direction 6 and the same spacing from one another as compared to slits 12, 13 in foot portion 8 of post 1 and 21. Thus, as a result of the smaller width of post 31, foot portion 8 of post 31 only comprises eight radially outer rods 15 and no radially inner rods.

At least two of the above described dental posts 1, 21, 31 differing in their width constitute a set of dental posts. Such a set has the advantage that for a given geometry of a dental cavity a most suitable post 1, 21, 31 can be selected. In this way, yet a further degree of adaptability to naturally occurring cavity shapes can be provided, in addition to the adaptability already provided by each post 1, 21, 31 itself due to the flexibility of its foot portion 8. Preferably, the set of dental posts further comprises at least an additional post having a larger width perpendicular to central axis 5 as compared to posts 1, 21, 31. The width of head portion 7 and foot portion 8 of the additional post is at least 2 mm and at most 4 mm. The additional post comprises at least 20 rods 14, 15, 24. The additional post comprises at most 40 rods 14, 15, 24. In this way, an even higher degree of adaptability to naturally occurring cavity shapes can be provided. Preferably, the planar cut-outs 12, 13 in foot portion 8 substantially have the same spacing and/or the same width perpendicular to axial direction 6 for all posts in the set of dental posts. In this way, similar flexibility properties can be provided for all the posts in the set, which properties can be optimized by the specific geometry of the single rods and/or an advantageous material selection of the posts.

FIGS. 4(a)-(d) show a dental post 41 according to a fourth embodiment. Structural elements and constituent parts corresponding to the embodiment of dental post 1 depicted in FIGS. 1(a)-(d) are indicated by the same reference numbers. Subsequently, only the differences of dental post 41 with respect to dental post 1 are described.

Post 41 comprises a head portion 47 comprising a lower portion 46 having the same circumferential shape as compared to substantially cylindrically shaped head portion 7 of post 1 and an upper portion 45 having a different shape than head portion 7 of post 1. Upper portion 45 is substantially formed as a sphere in order to provide an improved retention for a dental crown. In between upper portion 45 and lower portion 46, a circumferential groove 48 is cut out in a plane perpendicular to axial direction 6. Groove 48 is tapered toward central axis 5. A resulting wedge-shape of groove 48 is intended to further improve a fixation of a dental crown.

FIGS. 5(a)-(c) show a dental post 51 according to a fifth embodiment. Structural elements and constituent parts corresponding to the embodiment of dental post 1 and 41 depicted in FIGS. 1(a)-(d) and FIGS. 4(a)-(d) are indicated by the same reference numbers. Subsequently, only the differences of dental post 51 with respect to dental post 1 and 41 are described.

Post 51 comprises a head portion 57 having a cylindrical enveloping surface substantially corresponding to cylindrical surface 4 of head portion 7 of post 1. Head portion 57 comprises an additional surface structure 55 helically extending around central axis 5 along circumferential surface 4 of head portion 57. Helical surface structure 55 is cut out from head portion 57. The resulting thread formed reduction 55 of head portion 57 is intended to further improve the fixation of a dental crown.

In an embodiment, the above described set of posts further comprises at least an additional post 41, 51 having a different head portion 47, 57. Such an additional post 41, 51 with a different head portion 47, 57 may also be provided in multiple embodiments having different widths of foot portion 8, in particular such as the above described post 1 and/or post 21 and/or post 31. The set of dental posts comprising various posts with a different head portion 7, 47, 57 can be exploited not only for an advantageous selection of a suited post based on the shape of a given dental cavity, but also based on the properties of a specific dental crown to be fixed on head portion 7, 47, 57.

The mounting of the above described dental post 1, 21, 31, 41, 51 within a dental cavity is subsequently described by means of FIGS. 6(a)-(c) and FIGS. 7(a)-(c). In those figures, the above described post 1, 21, 31, 41, 51 is schematically depicted as a post 61.

Figure 7A:
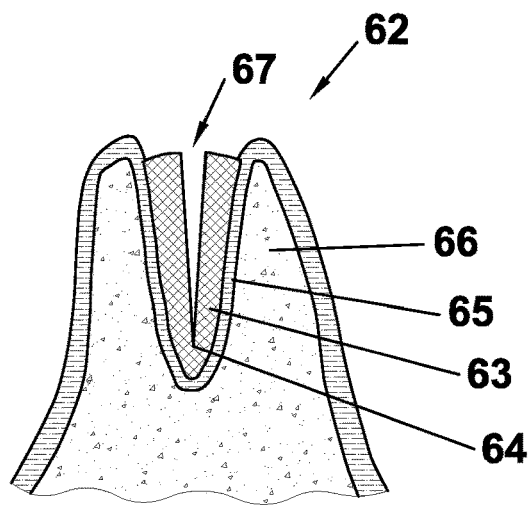
FIGS. 7(a)-(c) illustrate an installation of a dental post according to the invention in a first example of a dental cavity.

FIG. 6(a) and FIG. 7(a) schematically depict a respective natural tooth 62 being subjected to a reconstructive treatment. Teeth 62 comprise natural dentine 63 embedded in gum tissue 65 and bone 66. Tooth 62 comprises a dental cavity or root canal 67, 68 extending inside dentine 63. Naturally, the shape of such a dental cavity 67, 68 varies considerably between different teeth 62. Cavity 67 shown in FIG. 6(a) substantially extends rectilinearly with increasing depth and comprises a tapering toward its inner end 64. Cavity 68 shown in FIG. 7(a) also tapers toward its inner end 64 and also extends approximately rectilinearly at the upper third of its depth but then comprises an increasing curvature at the lower two thirds of its depth until it reaches its inner end 64. Traditional tooth reconstruction therapy would require a first step of reshaping cavity 67, 68 to a more cylindrical shape determined by the proportions of a dental post to be inserted inside the cavity. A dental post 61 according to the invention is aimed to be preferably directly applicable to various shapes of dental cavities 67, 68 such that a reshaping procedure of cavities 67, 68 can preferably be omitted or at least be simplified by a reduced amount of a required reshaping.

Figure 9:
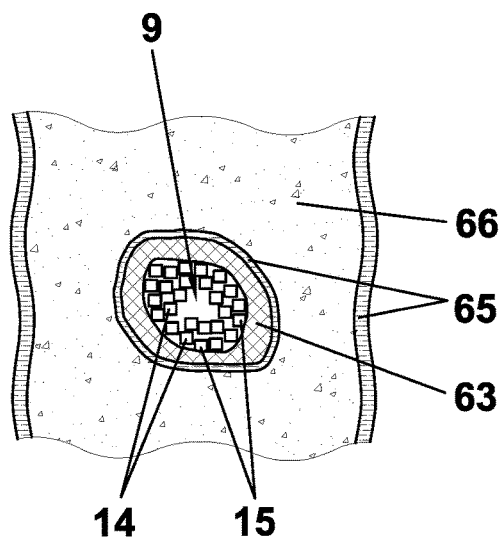
FIG. 9 illustrates the cross-section of a tooth filled with the post.

FIG. 9 shows a horizontal section according to IX-IX in FIG. 7a through a tooth 62 and demonstrates the usually irregular shape of the natural root canal 67, 68 and the circumventing dentine 63. The manifold of rods 14 constituting the foot portion 78 of the post 77, however, easily adjusts itself to the irregular shape of the root canal 67.

Furthermore, by the compression of the rods 14 toward the inner end 64 of the root canal 62, the more peripheral rods 14 get virtually shorter due to their being bent with respect to the centrally arranged rods 14 which merely straight extend toward the inner end 64. Thereby, the shape of the post 78 adapts to the tapering of the root canal 67, 68 without further measures.

Figure 7B:
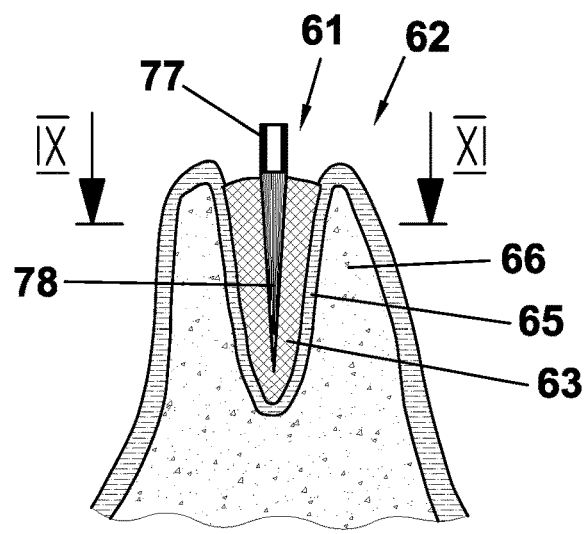

In an according application method, as depicted in FIG. 6(b) and FIG. 7(b), a fixing cement (not shown) is filled into cavities 67, 68 and then post 61 is inserted inside the respective cavity 67, 68 such that foot portion 78 of post 61 extends from the lower end of post 61 along the depth of cavity 67, 68 to an open outer end of cavity 67, 68. Head portion 77 protrudes from the open outer end of cavity 67, 68. Due to the flexibility and adaptability of the various rods constituting foot portion 78, an insertion and fixation within various cavity shapes 67, 68 can be achieved.

Figure 7C:
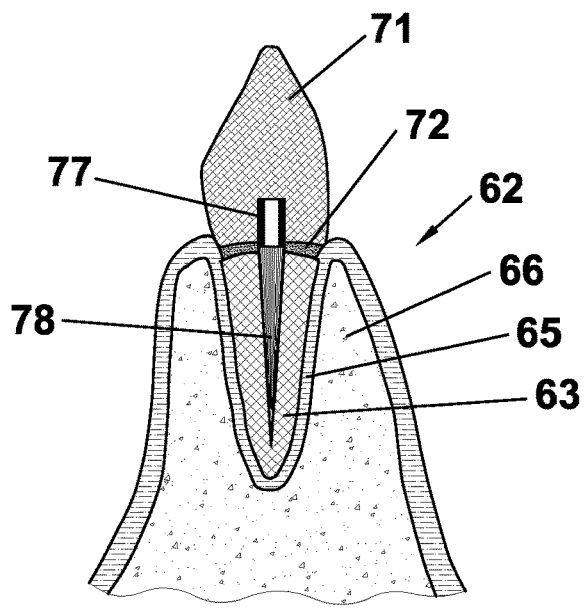
Figure 8A:
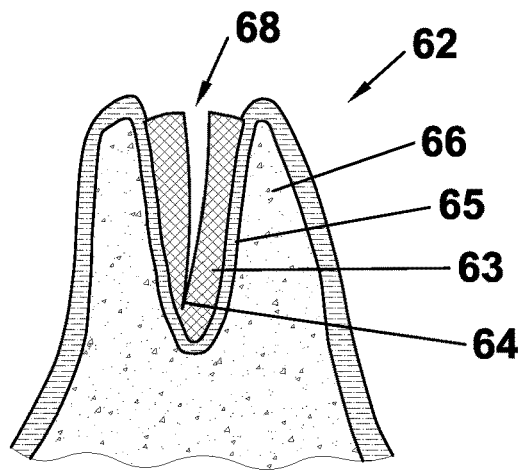
FIGS. 8(a)-(c) illustrate an installation of a dental post according to the invention in a second example of a dental cavity.
Figure 8B:
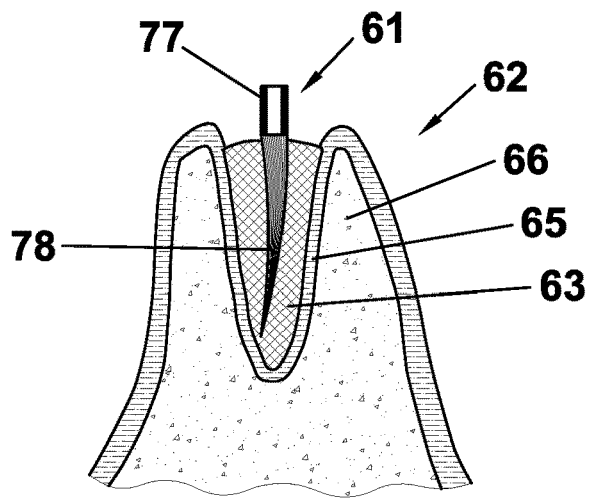
Figure 8C:
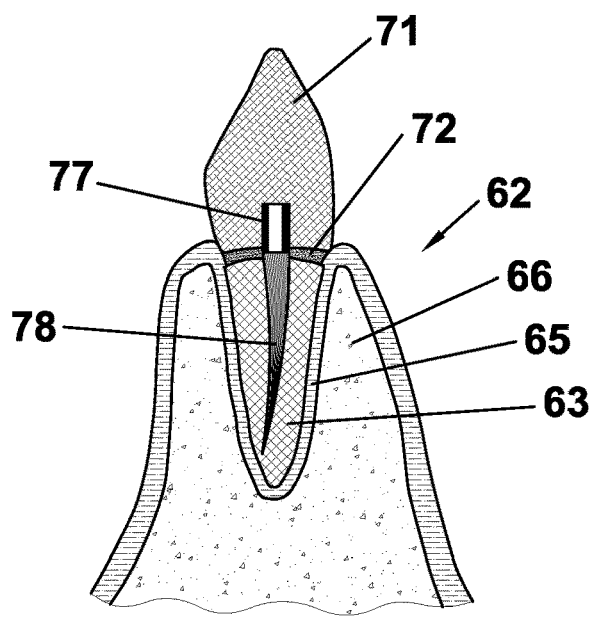

After fixation of foot portion 78 inside cavity 67, 68, as shown in FIG. 6(c) and FIG. 7(c), a dental crown 71 can be mounted on head portion 77 of dental post 61 by means of a fixing cement 72, in order to replace the natural dentine and/or enamel of the reconstructed tooth 62.

According to another application (cf. FIG. 10), the head portion 7 of the post 1 (according to any of FIGS. 1 to 5) is cut off after pushing the post 1 into the root canal 67. After positioning such a first post 1, a second and further posts 1 may be inserted into the same root canal 67 with each time cutting off the head portion 7. The result is a bundle 81 of rods protruding from the root canal 67. The prosthetic superstructure will be attached to the protruding portion 83 of the bundle 81.

The rods of the first inserted post (preferably significantly thinner than the root canal) may easily be pushed down closely to the lower narrowed end of the root canal 67. The rods of posts inserted afterwards intermingle with the rods already located in the root canal 67 and may be pushed down only up to a point where the cross-section of the root canal 67 is such narrow that its cross-section is about filled with the rods. As a consequence, the root canal may be provided with an optimally dense arrangement of rods even in case of a severely tapered root canal 67. Furthermore, one or more rods may be selectively removed, partially retracted or even pushed deeper into the root canal.

The protruding rods 83 may then be used in a manner known per se for attaching a tooth prosthesis like a crown or other tooth restoration arrangement.

Obviously, in this application, the head portion may have any shape rendering it suited as a handle, i.e. for facilitating holding it by hand or by a suitable tool like tweezers. Such shapes may be simply cylindrical with a circular or other cross-section, possibly with varying thickness for a better grip.

Figure 10:
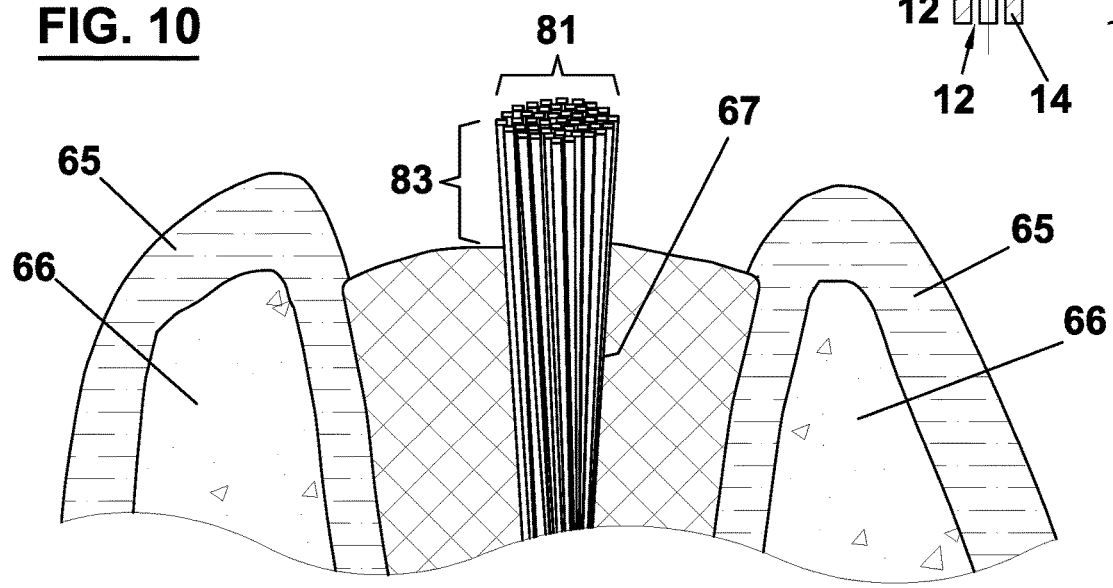
FIG. 10 illustrates the filling a dental cavity using more than one post.

If the rods consist of a transparent material like polymethylmethacrylate, they may even serve as light guides for improved curing by (UV) light of the cement used for anchoring the post in the root canal. Of course, if other radiation or electromagnetic waves are used, the material is to be chosen so that it is transparent to that radiation and able to guide it into the root canal. Obviously, in particular the bundle 81 of rods illustrated in FIG. 10 is suited to serve as light (or energy) guiding means due to the open cut ends of the rods 14, 15.

Another aspect is that the post allows minimum invasive dentistry in that adapting of the root canal to the posts is reduced or even avoided.

From the foregoing description, numerous modifications of the dental post, the set of dental posts and the fabrication method according to the invention are apparent to one skilled in the art without leaving the scope of protection of the invention that is solely defined by the claims.

Figure 11:
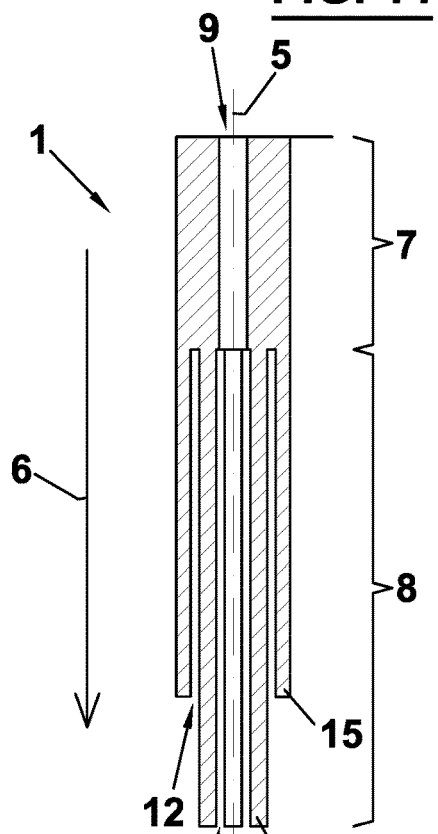
FIG. 11 shows a post adapted to a tapered dental cavity.

Such conceivable modifications are, for example:

As shown in FIG. 11, the ends the rods 14, 15 may have different lengths, in particular outer rods 15 positioned more peripherally are shorter than inner rods 14 located more centrally. There may be 2, 3, 4 or more steps of lengths of rods so that starting from the longest inner rods 14, the length of the rods decreases stepwise toward the periphery. Thereby, the post 1 is provided with a tapered shape toward the tip in adaptation to a dental cavity 67, 68 in which the post has to be anchored.

The removal of rods of incomplete cross section may be performed in reducing the diameter of the head portion after separating the rods by machining the slits 12 between the rods, and removing those rods which radially extend beyond the surface of the head portion, hence are connected only by a substantially reduced material to the head portion. Rods having no connection anymore with the head portion drop off during this shaping of the head portion.

The slits 12, 13 may be cut in another angle, or there may be additional slits, e.g. for producing rods of a polygonal cross-section. Such a cross-section may be hexagonal.

The invention claimed is:

1. A dental post configured to be fitted within a dental cavity wherein of a tooth being restored, the post comprising a head portion and a foot portion consecutively arranged in an axial direction of the post, said axial direction being defined as a direction in which a central axis of the head portion extends, the foot portion comprising a free lower end such that the post can be inserted into the dental cavity in said axial direction with said lower end inwardly facing a closed inner end of the dental cavity, at least the foot portion being composed of a composite material comprising a resin matrix reinforced with fibers, the foot portion comprises a plurality of rods being separated from one another along the axial direction of the post such that each rod is bendable in a transverse direction with respect to the axial direction, wherein the head portion has a bottom face, the head portion is configured so that a crown can be secured thereto, and upper ends of the rods of the foot portion are affixed to the bottom face of the head portion.

2. The dental post according to claim 1, wherein each of the plurality of rods has a cross section being substantially uniform along its length in the axial direction.

3. The dental post according to claim 1, wherein said separation of the plurality of rods is provided by cut-outs in the foot portion in between the rods.

4. The dental post according to claim 3, wherein said cut-outs are planar cut-outs extending in the axial direction.

5. The dental post according to claim 4, wherein two groups of said planar cut-outs are provided, the cut-outs of each group extend in parallel to one another.

6. The dental post according to claim 5, wherein cut-outs of a group, that is different from said groups of cut-outs, are perpendicular to one another.

7. The dental post according to claim 3, wherein said cut-outs have a width providing a spacing in between the rods perpendicular to said axial direction, said width of the cut-outs is at least 1 μm.

8. The dental post according to claim 3, wherein at least part of each of the plurality of rods comprises a substantially rectangular cross section.

9. The dental post according to claim 3, wherein at least part of each of the plurality of rods comprises a curved surface portion.

10. The dental post according to claim 3, wherein said cut-outs have a width providing a spacing in between the rods perpendicular to said axial direction, said width of the cut-outs is at least 5 µm.

11. The dental post according to claim 3, wherein said cut-outs have a width providing a spacing in between the rods perpendicular to said axial direction, said width of the cut-outs is at least 10 µm.

12. The dental post according to claim 1, wherein said plurality of rods comprises at least four rods.

13. The dental post according to claim 1, wherein said plurality of rods comprises at most 50 rods.

14. The dental post according to claim 1, wherein at least one hole is provided in the foot portion, the hole extending in the axial direction.

15. The dental post according to claim 14, wherein the hole has a circular cross section.

16. A set of dental posts comprising at least two dental posts according claim 1, wherein the head portions of the posts have a different width perpendicular to the axial direction and wherein the foot portion of at least one of the posts having the head portion with a smaller width comprises a smaller number of rods as compared to the foot portion of at least one of the posts having the head portion with a larger width.

17. A method for fabricating a dental post according to claim 1, wherein a solid cylindrical body of said composite material is provided, and wherein said body is cut over a partial length of the body in parallel to the axial direction such that said separation of the rods is provided at said partial length.

18. Use of the post according to claim 1 for filling a root canal with an anchoring arrangement for a dental prosthetic superstructure, wherein at least two posts are sequentially pushed into a root canal and the head portion is each time removed in order to yield a bundle of rods with a protruding section of the bundle accessible to be provided with a superstructure.

19. The dental post according to claim 1, wherein said plurality of rods comprises at least at least eight rods.

20. The dental post according to claim 1, wherein said plurality of rods comprises at most 30 rods.

* * * * *